United States Patent
Suzuki et al.

(10) Patent No.: US 7,952,469 B2
(45) Date of Patent: May 31, 2011

(54) COLLISION DETECTION DEVICE AND METHOD OF MANUFACTURING THE SAME

(75) Inventors: Akira Suzuki, Hekinan (JP); Hiroyuki Takahashi, Nishikamo-gun (JP); Ryotaro Kachu, Nishikamo-gun (JP); Yujiro Miyata, Kariya (JP); Motomi Iyoda, Seto (JP)

(73) Assignees: DENSO CORPORATION, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 622 days.

(21) Appl. No.: 11/666,127

(22) PCT Filed: Oct. 27, 2005

(86) PCT No.: PCT/JP2005/020170
§ 371 (c)(1),
(2), (4) Date: Aug. 28, 2007

(87) PCT Pub. No.: WO2006/046771
PCT Pub. Date: May 4, 2006

(65) Prior Publication Data
US 2008/0122599 A1 May 29, 2008

(30) Foreign Application Priority Data
Oct. 28, 2004 (JP) ................ 2004-314412

(51) Int. Cl.
*B60Q 1/26* (2006.01)
(52) U.S. Cl. ............ 340/436; 340/435; 340/463; 701/1; 701/36; 701/45

(58) Field of Classification Search .......... 340/436, 340/425.5, 555, 435, 463; 280/735; 293/132; 701/1, 36, 45
See application file for complete search history.

(56) References Cited

U.S. PATENT DOCUMENTS

| | | | | |
|---|---|---|---|---|
| 3,597,425 A * | 8/1971 | Shaines | ............... | 264/246 |
| 3,639,748 A * | 2/1972 | Pearson et al. | ............... | 362/505 |
| 4,099,759 A * | 7/1978 | Kornhauser | ............... | 293/110 |
| 5,335,749 A | 8/1994 | Taguchi et al. | | |
| 5,844,488 A * | 12/1998 | Musick | ............... | 340/573.4 |
| 5,876,077 A * | 3/1999 | Miskech et al. | ............... | 293/132 |

(Continued)

FOREIGN PATENT DOCUMENTS
DE   2 212 190   9/1973
(Continued)

OTHER PUBLICATIONS

Office Action dated Sep. 20, 2007 in corresponding European Patent Application No. 05800103.3 (and English translation).

(Continued)

*Primary Examiner* — George A Bugg
*Assistant Examiner* — Ojiako Nwugo
(74) *Attorney, Agent, or Firm* — Posz Law Group, PLC (57) ABSTRACT

A collision detection device is provided with a load detection member 2 for detecting a collision load in a collision, and a mold member 3 which is molded to be integral with the load detection member 2. The mold member 3 covers at least the surface of a collision side of the load detection member 2, to absorb at least a part of impact energy in the collision by a resilient deformation of the mold member 3. Thus, the collision detection device is substantially resistant to an impact in the collision, while being simply manufactured.

25 Claims, 9 Drawing Sheets

U.S. PATENT DOCUMENTS

| | | | |
|---|---|---|---|
| 6,264,869 B1 * | 7/2001 | Notarpietro et al. | 264/247 |
| 6,540,275 B1 | 4/2003 | Iwamoto et al. | |
| 6,607,212 B1 * | 8/2003 | Reimer et al. | 280/735 |
| 6,960,992 B2 | 11/2005 | Moritz et al. | |
| 7,144,616 B1 * | 12/2006 | Unger et al. | 428/172 |
| 2002/0066978 A1 * | 6/2002 | Kim et al. | 264/259 |
| 2003/0235272 A1 * | 12/2003 | Appleby et al. | 378/147 |
| 2005/0000065 A1 * | 1/2005 | Browne et al. | 24/442 |
| 2005/0200139 A1 | 9/2005 | Suzuki | |

FOREIGN PATENT DOCUMENTS

| | | |
|---|---|---|
| DE | 44 33 046 A1 | 3/1996 |
| DE | 19537383 | 4/1997 |
| DE | 202004005434 | 8/2004 |
| DE | 202004005434 U1 * | 9/2004 |
| FR | 2825055 | 11/2002 |
| FR | 2825055 A1 * | 11/2002 |
| JP | Y2-2-3173 * | 1/1990 |
| JP | 05330401 A * | 12/1993 |
| JP | 1993330401 A1 * | 12/1993 |
| JP | 1993330401 A1 * | 12/1993 |
| JP | A-05-330401 | 12/1993 |
| JP | A-H7-190732 | 7/1995 |

OTHER PUBLICATIONS

Office Action dated Aug. 19, 2008 in corresponding Japanese patent application No. 2004-314412 (and English translation).

Office Action dated Nov. 7, 2008 in corresponding Japanese patent application No. 2004-314412 (and English translation).

Office Action dated Nov. 14, 2008 in corresponding Chinese patent application No. 200580037103.4 (and English translation).

* cited by examiner

COLLISION DETECTION DEVICE AND METHOD OF MANUFACTURING THE SAME

TECHNICAL FIELD

The present invention relates to a collision detection device for detecting a collision load, and a method of manufacturing the same.

BACKGROUND ART

Referring to JP-7-190732A, for example, a vehicle is provided with a collision detection sensor (collision detection device) having an optical fiber member. The optical fiber member is attached to a front bumper of the vehicle, and protrudes to an outer side of the front bumper. The optical fiber member is provided with a light-emitting member and a light-receiving member which are respectively arranged at two longitudinal-direction ends of the optical fiber member. When the vehicle collides with an obstacle, a collision load will be exerted at the optical fiber member, so that the optical fiber member is deformed to cause a variation of a light-receiving amount of the light-receiving member. Thus, the collision detection sensor generates a collision signal based on the variation of the light-receiving amount.

However, in this case, because the optical fiber member protrudes toward the outer side of the vehicle, a fault of the optical fiber member can be caused when the impact in the collision is relatively large.

Referring to JP-5-45372A, a collision detection sensor having an optical fiber member and a urethane resin member is provided. The optical fiber member is fixed inside the urethane resin member having a long prism shape. In this case, the fault of the optical fiber member can be restricted even when the collision load is large.

However, the optical fiber member is to be disposed in the urethane resin member. Because the optical fiber member has a long shape which is similar to that of the urethane resin member, it is difficult to arrange the optical fiber member at a predetermined position in the urethane resin member. Thus, the manufacture of the collision detection sensor is complicated.

DISCLOSURE OF THE INVENTION

In view of the above-described disadvantages, it is an object of the present invention to provide a collision detection device and a method of manufacturing the same, so that the collision detection device is substantially resistant to an impact in a collision and simply manufactured.

According to an aspect of the present invention, a collision detection device is provided with a load detection member for detecting a collision load in a collision, and a mold member which is molded to be integral with the load detection member. The mold member covers at least the surface of a collision side of the load detection member. The mold member absorbs at least a part of impact energy in the collision through a resilient deformation.

Because the mold member is integrated with the load detection member by molding, the manufacture of the collision detection device is simplified as compared with the case where the load detection member and a covering member are separately constructed and then integrally bonded through an adhesive, a double-sided tape or the like.

Moreover, the joining strength between the mold member and the load detection member is heightened, because the mold member is integrated with the load detection member by molding. Thus, a detachment of the mold member from the load detection member can be restricted even when the impact due to the collision is relatively large.

Because the mold member absorbs at least a part of the impact energy in the collision through a resilient deformation, a fault of the load detection member can be restricted even when the impact is relatively large.

Preferably, the load detection member is a bend-typed load detection member which includes a frontal portion and two incline portions. The frontal portion has a surface facing the side of the collision direction. The incline portion has a surface which extends in an extension direction intersecting that of the frontal portion. The mold member which covers the incline portion has a smaller spring constant than that covers the frontal portion.

Figure 1:
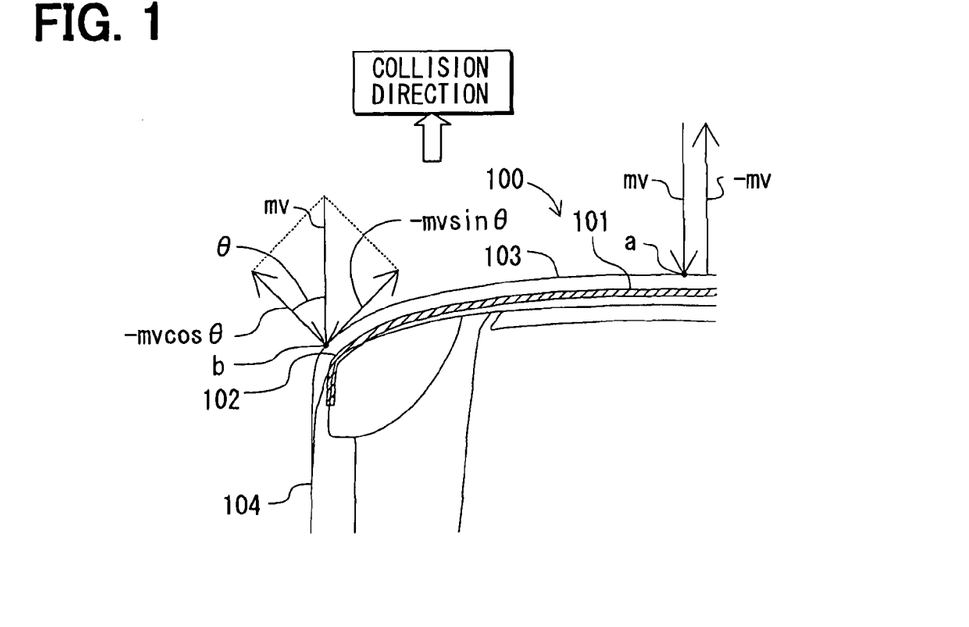
FIG. 1 is a schematic view showing a load-detecting mechanism of a bend-typed load detection portion.

FIG. 1 shows the load-detecting mechanism of a bend-typed load detection member 100, without limiting the structure thereof. The bend-typed load detection member 100 is accommodated in a front bumper 103 of a vehicle 104, for example. The bend-typed load detection member 100 includes a frontal portion 101 which is perpendicular to a vehicle front-rear direction (collision direction), and an incline portion 102 which intersects the collision direction at an angle θ. In FIG. 1, the frontal portion 101 is connected with the incline portion 102. Alternatively, the bend-typed load detection member 100 can be also provided with the frontal portion 101 and the incline portion 102 which are separated from each other.

In the case where an obstacle having a mass m collides with the vehicle 104 at a frontal occupancy position "a" at a relative velocity v, a momentum mv is input into the frontal portion 101 at the frontal occupancy position "a". On the other hand, a momentum −mv is output from the frontal portion 101 at the frontal occupancy position "a". Thus, a momentum variation ΔP equal to 2 mv is caused in the collision. The frontal portion 101 detects a collision load in the collision based on the momentum variation ΔP.

On contrast, when the obstacle collides with the incline portion 102 at an incline occupancy position "b", a momentum mv is input into the incline portion 102 at the incline occupancy position "b". Because the incline portion 102 intersects the collision direction at the angle θ, the momentum mv is disassembled into a component −mv cos θ perpendicular to the incline portion 102 at the incline occupancy position "b" and a component −mv sin θ parallel to the incline portion 102 at the incline occupancy position "b". Thus, it is difficult for the incline portion 102 to detect the component −mv sin θ which is parallel to the incline portion 102 at the incline occupancy position "b". Thus, the detectable collision load of the incline portion 102 is smaller than that of the frontal portion 101.

Because the spring constant of the mold member covering the incline portion is set smaller than that covering the frontal portion, so that the mold member covering the incline portion has a larger deformation than that covering the frontal portion when the same load is exerted at the incline portion and the frontal portion. Thus, a disparity in the outputs of the incline portion and the frontal portion of the bend-typed load detection member can be reduced.

More preferably, the collision detection device further includes an attachment member for an attachment of the load detection member. The mold member is molded to be integral with the attachment member.

Because the mold member is integrated with the attachment member by molding, the constructing operation can be simplified.

More preferably, the collision detection device further includes a low-stiffness member which has a lower stiffness than a high-stiffness member, and a concave-convex member which is arranged at least at a position between the load detection member and the high-stiffness member and a position between the load detection member and the low-stiffness member. The load detection member is arranged between the high-stiffness member and the low-stiffness member. The mold member is molded to be integral with the concave-convex member.

Therefore, the load detection member and the concave-convex member can be fixed by the molding of the mold member, thus simplifying the constructing operation of the collision detection device. Moreover, the detection sensitivity of the load detection member can be improved because the pressure partially exerted thereat is increased due to the arrangement of the concave-convex member.

More preferably, the load detection member is an optical fiber member. Thus, the collision load can be detected with respect to inline or in-surface positions, without being detected point-by-point. That is, the collision load can be detected in a relatively extensive range by adjusting an arrangement path of the optical fiber member.

According to another aspect of the present invention, a method of manufacturing a collision detection device, which has an attachment member, a load detection member, a concave-convex member and a mold member, is provided. The method includes a swaging process, a first injecting process, a movable-die replacing process, a second injecting process and a die removing process. At the swaging process, a stationary die and a first movable die are swaged and spaced from each other by a cavity having a substantially c-shaped cross section. At the first injecting process, a first material which is melted is injected into the cavity to form the attachment member. At the movable-die replacing process, the first movable die is replaced by a second movable die. The load detection member and the concave-convex member which are beforehand manufactured are disposed in the attachment member after the first movable die is withdrawn. A cavity is formed between the second movable die and the attachment member after the second movable die is arranged. At the second injecting process, a second material which is melted is injected into the cavity to form the mold member. At the die removing process, the stationary die and the second movable die are removed.

Thus, the mold member can be attached to the attachment member by molding. The mold member covers at least the surface of the collision side of the load detection member. The mold member, the attachment member and the load detection member are integrated with each other by molding. Therefore, the manufacture of the collision detection device according to the present invention is simplified, as compared with the case where the mold member is arranged at the load detection member and thereafter bonded to the attachment member by an adhesive, a double-sided tape or the like.

Because the mold member, the attachment member and the load detection member are integrated with each other by molding, the joining strength between different components can be heightened. Accordingly, detachment of the components from each other can be restricted even when the impact due to the collision is relatively large.

In this case, not only the load detection member but also the concave-convex member can be fixed by the mold member. Thus, the manufacture is simplified as compared with the case where the concave-convex member is mounted in a process different from the molding process.

PREFERRED EMBODIMENTS OF THE PRESENT INVENTION

First Embodiment

Figure 2:
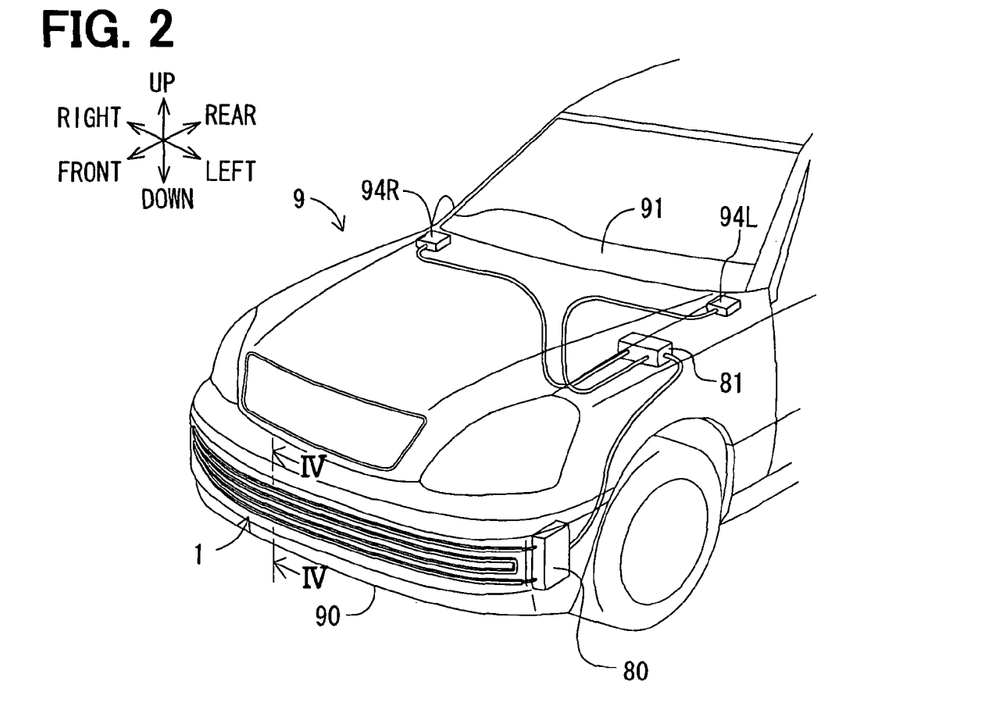
FIG. 2 is a transparent perspective view showing a vehicle provided with a collision detection device according to a first embodiment of the present invention.

A collision detection device 1 according to a first embodiment of the present invention will be described with reference to FIGS. 2-11. As shown in FIG. 2, the collision detection device 1 is suitably used for a vehicle 9. The collision detection device 1 can be mounted, for example, in a front bumper 90 of the vehicle 9 and extend in a vehicle right-left direction. A left end and a right end of the collision detection device 1 are respectively bent rearward to a left side and a right side of the vehicle 9.

The up-down direction, the right-left direction and the front-rear direction indicated in figures respectively correspond to the vehicle up-down direction, the vehicle right-left direction (i.e., vehicle width direction) and the vehicle front-rear direction, which are defined according to the traveling direction of the vehicle 9 as a criterion.

The collision detection device 1 is connected with a detection circuit 80, which is connected with an airbag ECU 81 (electronic control unit) through a harness or the like. The airbag ECU 81 is arranged between a floor tunnel (not shown) and a center portion (of vehicle width direction) of an instrument panel 91 of the vehicle 9. The airbag ECU 81 is connected with pedestrian-protecting airbags 94L and 94R through harnesses or the like. The pedestrian-protecting airbags 94L and 94R are respectively buried in root portions of A-pillars of the vehicle 9.

Figure 3:
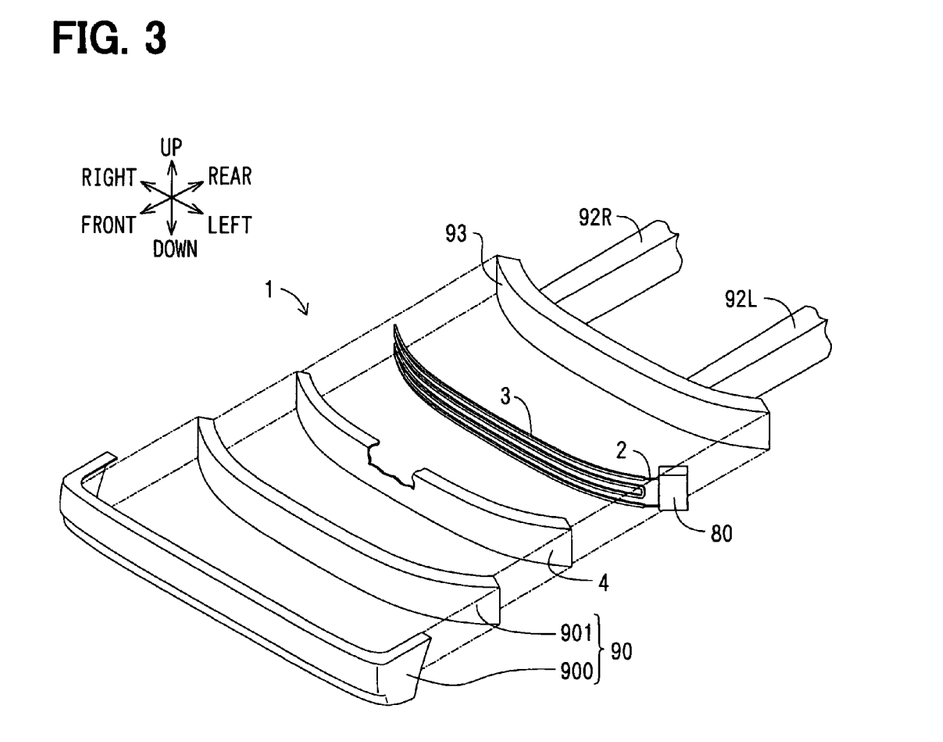
FIG. 3 is a disassembled perspective view showing a front bumper at which the collision detection device is mounted according to the first embodiment.

FIG. 3 shows a disassembled perspective view of the front bumper 90, in which the collision detection device 1 is mounted. Referring to FIG. 3, the front bumper 90 is provided with a bumper cover 900 and an absorber 901. The bumper cover 900 is made of a resin or the like, and has a long-strip shape extending in the vehicle width direction. Both right and left ends of the bumper cover 900 are bent to the vehicle rear side. The absorber 901, being made of a foam resin or the like, has a long-plate shape extending in the vehicle width direction. The absorber 901 is disposed at the vehicle rear side of the bumper cover 900.

A bumper reinforce member 93 (i.e., high-stiffness member) is attached to front ends of a pair of front side members 92R and 92L, which are made of steel or the like. The bumper reinforce member 93, being made of aluminum or the like, extends in the vehicle width direction and has a long rectangular-cylinder shape. The collision detection device 1 is mounted between the absorber 901 and the bumper reinforce member 93, which is positioned at the vehicle rear side of the absorber 901.

Figure 4:
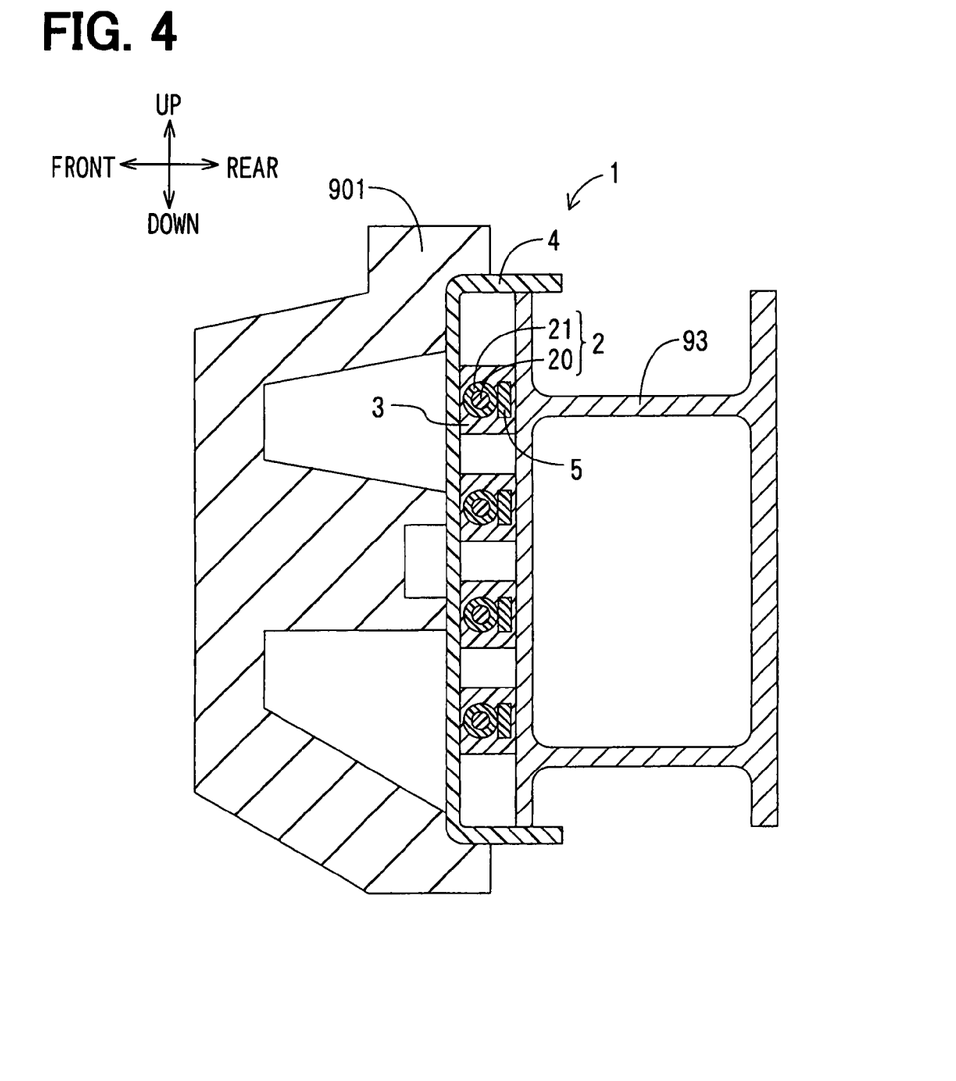
FIG. 4 is a vertical sectional view taken along a line IV-IV in FIG. 2.

Next, the configuration of the collision detection device 1 will be described. FIG. 4 is a vertical sectional view taken along the line IV-IV in FIG. 2. The bumper cover 900 is not shown in FIG. 4 for a simplification.

Referring to FIG. 4, the collision detection device 1 includes a load detection member 2 (e.g., optical fiber member), a mold member 3, an attachment member 4 (i.e., load transmission member) and a concave-convex member 5. The load transmission member 4 corresponds to a low-stiffness member having a lower stiffness than the bumper reinforce member 93 (high-stiffness member).

The load transmission member 4 (shown in FIG. 3 at a partial rupture state for clarification) extends in the vehicle width direction and has a substantial long-plate shape, for example. The load transmission member 4 is made of a polybutylene terephthalate (PBT), and disposed at the rear side of the absorber 901. The load transmission member 4 is provided with an opening facing the vehicle rear side when being viewed from the side surface of the vehicle 9, to have a substantially c-shaped cross section.

Figure 5:
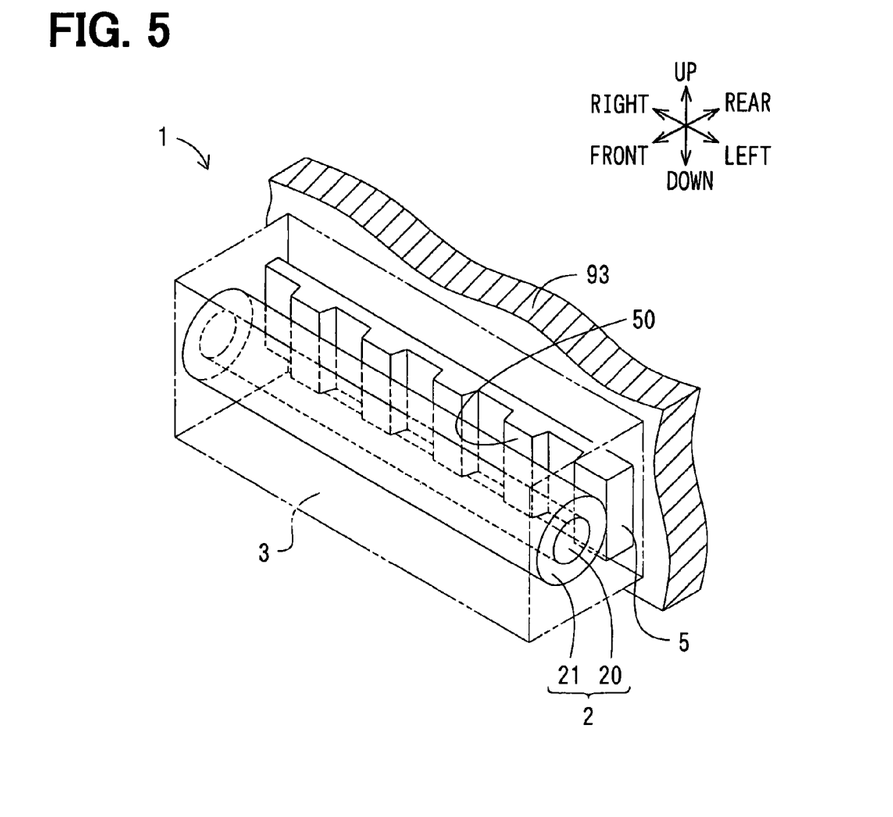
FIG. 5 is a transparent perspective view showing a vicinity of an optical fiber member of the collision detection device according to the first embodiment.

As shown in FIG. 5, the optical fiber member 2 is disposed in the opening of the load transmission member 4. The optical fiber member 2 has a substantial cord shape, and traverses the load transmission member 4 in the vehicle width direction for four times, for example. That is, the opening of the load transmission member 4 is provided with the optical fiber member 2 therein going-returning twice in the vehicle width direction.

The optical fiber member 2 includes a core portion 20 and a clad portion 21. The core portion 20 is made of an acrylic material and has a cord shape with a substantially round cross section. The clad portion 21, being made of a fluorine-contained resin, has a cord shape with a ring-like cross section to cover (surround) the core portion 20.

The concave-convex member 5 for improving a detection sensitivity of the load detection member 2 (optical fiber member) has a substantial tape shape, and is made of a polybutylene terephthalate (PBT), for example. The concave-convex member 5 can be positioned at the vehicle rear side of the optical fiber member 2, and extends along the arrangement path of the optical fiber member 2. The concave-convex member 5 is provided with multiple protrusion potions 50, which can be formed at a front surface of the concave-convex member 5 and contact the rear surface of the clad portion 21 of the optical fiber member 2. A predetermined distance is arranged between the adjacent protrusion portions 50.

In this embodiment, the mold member 3 is transparent, and made of a transparent silicon rubber, for example. The mold member 3, having a cord shape with a substantially rectangular cross section, covers (surrounds) the optical fiber member 2 and the concave-convex member 5. That is, the optical fiber member 2 and the concave-convex member 5 are disposed in the mold member 3. The mold member 3 is integrated with the optical fiber member 2, the concave-convex member 5 and the load transmission member 4.

Next, the operation of the collision detection device 1 will be described.

When the vehicle 9 collides with an obstacle (not shown) at the front side of the vehicle 9, a collision load will be transmitted to the collision detection device 1 through the bumper cover 900 and the absorber 901. The bumper reinforce member 93 is provided with a high stiffness. The stiffness of the load transmission member 4 is higher than those of the mold member 3 and the optical fiber member 2, while being lower than that of the bumper reinforce member 93.

Thus, the mold member 3 and the optical fiber member 2, which are disposed between the load transmission member 4 and the bumper reinforce member 93, will be deformed in the vehicle front-rear direction due to the impact from the collision. Moreover, because the concave-convex member 5 is arranged in the mold member 3 and disposed between the bumper reinforce member 93 and the optical fiber member 2, a relatively high pressure due to the impact of the collision will be exerted at a part of the optical fiber member 2 which contacts the protrusion portions 50 of the concave-convex member 5.

The detection circuit 80 is provided with a LED (light-emitting diode), a PD (photo diode), an amplifier and an A/D (analog/digital) converter, which are not shown. The LED and the PD are respectively arranged at two longitudinal-direction (i.e., vehicle width direction) ends of the optical fiber member 2. When light emitted by the LED is transmitted to the PD through the optical fiber member 2, electric current will be generated in the PD.

In the case where the optical fiber member 2 is deformed due to the collision, the light-receiving amount of the PD will be decreased so that the electric current generated in the PD is reduced. The current variation is converted into a voltage variation, which will be amplified by the amplifier and converted into a digital signal by the A/D converter.

The digital signal is transmitted to the airbag ECU 81. The airbag ECU 81 determines whether or not the obstacle is a pedestrian based on the digital signal. In the case where it is determined that the obstacle is the pedestrian, the airbag ECU 81 will send driving signals to the pedestrian-protecting airbags 94L and 94R. Thus, the pedestrian-protecting airbags 94L and 94R are speedily unfolded toward the outer side of the vehicle 9.

Next, the method of manufacturing the collision detection device 1 will be described. The manufacture method includes a swaging process, a first injecting process, a movable-die replacing process, a second injecting process and a die removing process.

Figure 6:
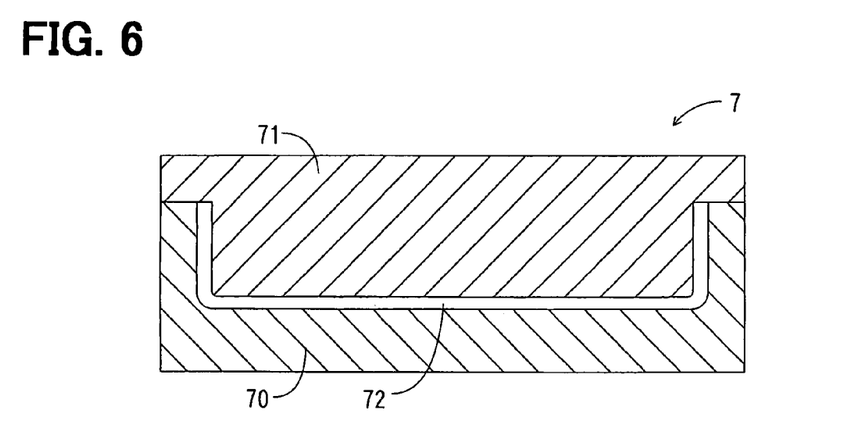
FIG. 6 is a lateral-direction sectional view of a die for molding the collision detection device according to the first embodiment.

FIG. 6 is a lateral-direction sectional view showing a die 7 for constructing the collision detection device 1. Referring to FIG. 6, the die 7 includes a stationary die 70 and a first movable die 71. At the swaging process, the die 7 is swaged. A cavity 72 having a substantially c-shaped cross section is formed between the stationary die 70 and the first movable die 71.

Figure 7:
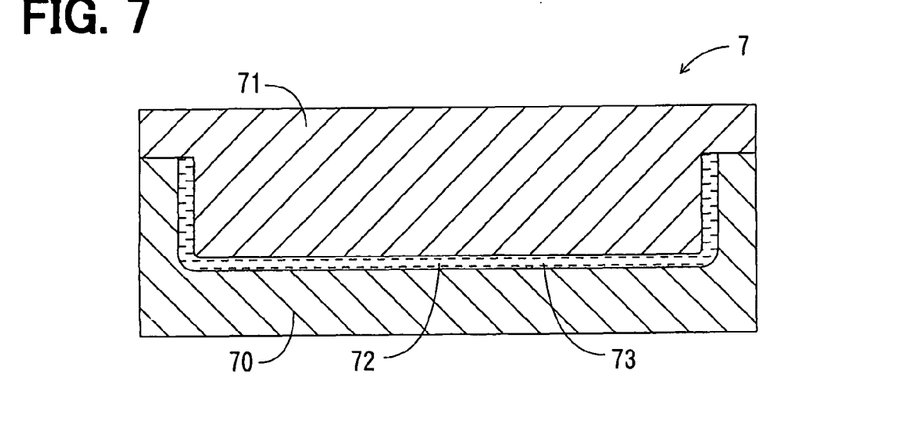
FIG. 7 is a lateral-direction sectional view of the die after a polybutylene terephthalate is injected according to the first embodiment.

At the first injecting process, the melted polybutylene terephthalate is injected into the cavity 72. FIG. 7 is a lateral-direction sectional view showing the die 7 after the polybutylene terephthalate (first material) is injected. Referring to FIG. 7, the cavity 72 is filled with the melted polybutylene terephthalate therein, which will become cool in the cavity 72. Thus, the polybutylene terephthalate (polybutylene terephthalate member 73) is hardened to construct the load transmission member 4.

Figure 8:
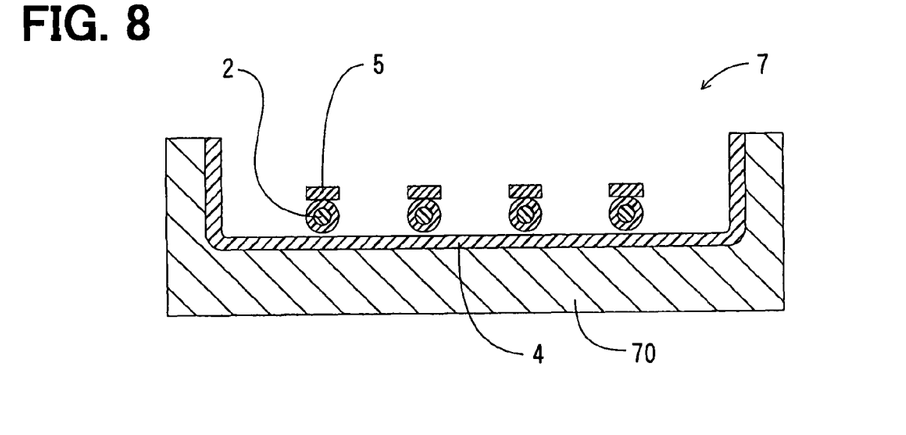
FIG. 8 is a lateral-direction sectional view showing the die after a first movable die is withdrawn according to the first embodiment.

At the movable-die replacing process, the first movable die 71 is replaced with a second movable die 74. At first, the first movable die 71 is withdrawn. FIG. 8 is a lateral-direction sectional view showing the die 7 after the first movable die 71 is withdrawn. Referring to FIG. 8, the load transmission member 4 is formed at a die surface of the stationary die 70. Next, the optical fiber member 2 and the concave-convex member 5 which have been beforehand manufactured are disposed in the c-shaped opening of the load transmission member 4, and arranged along the predetermined arrangement path. The optical fiber member 2 and the concave-convex member 5 are supported by a support unit (e.g., pin which is not shown), and spaced from the load transmission member 4 at a predetermined distance. Thereafter, the second movable die 74 is mounted at the stationary die 70.

Figure 9:
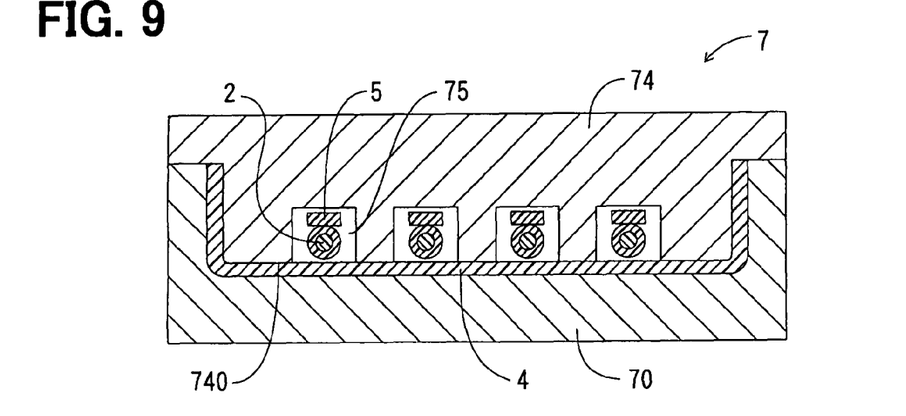
FIG. 9 is a lateral-direction sectional view showing the die after a second movable die is arranged according to the first embodiment.

FIG. 9 is a lateral-direction sectional view showing the die 7 after the second movable die 74 is arranged. Referring to FIG. 9, a die surface 740 of the second movable die 74 is provided with a concave-convex shape. A cavity 75 is formed between the second movable die 74 and the load transmission member 4, and extends along the arrangement path of the optical fiber member 2. The optical fiber member 2 and the concave-convex member 5 are accommodated in the cavity 75.

Figure 10:
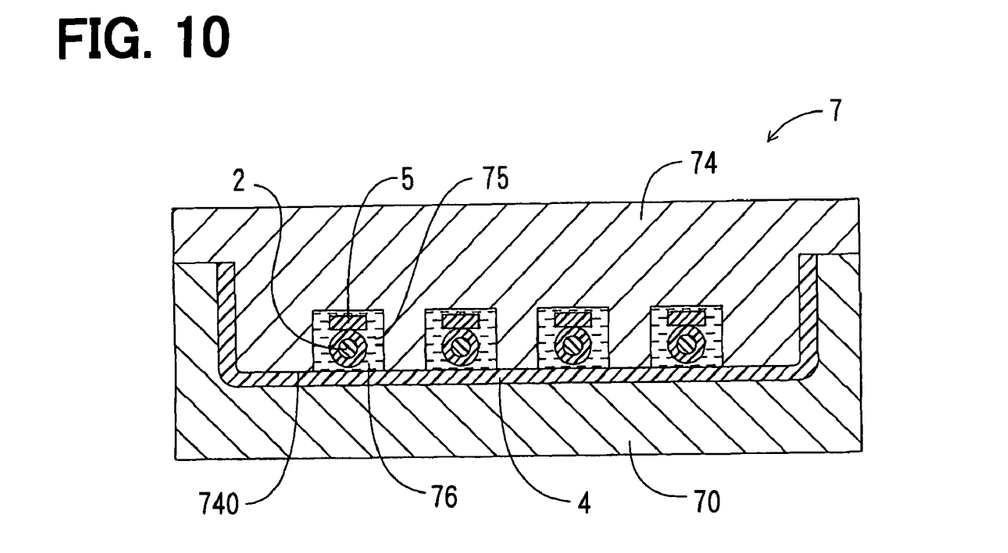
FIG. 10 is a lateral-direction sectional view showing the die after a silicon rubber is injected according to the first embodiment.

At the second injecting process, the melted silicon rubber (second material) is injected into the cavity 75. FIG. 10 is a lateral-direction sectional view showing the die 7 after the silicon rubber is injected. Referring to FIG. 10, the cavity 75 is filled with the melted silicon rubber, which will become cool to be hardened gradually. Thus, the optical fiber member 2 and the concave-convex member 5 are fixed in the silicon rubber (silicon rubber member 76). In this case, the silicon rubber member 76 will be joined to the load transmission member 4 which is warm yet. The silicon rubber member 76 which is solidified forms the mold member 3.

Figure 11:
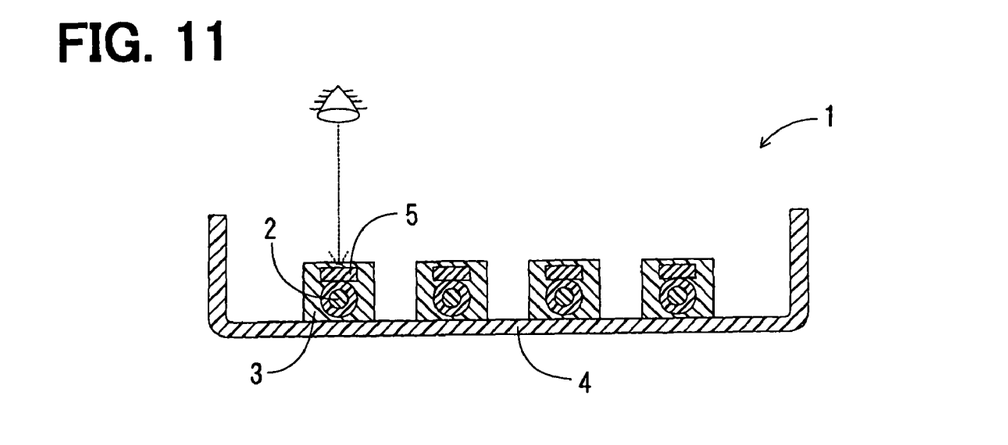
FIG. 11 is a lateral-direction sectional view showing the collision detection device after the dies is removed according to the first embodiment.

At the die removing process, the stationary die 70 and the second movable die 74 are removed. FIG. 11 is a lateral-direction sectional view showing the collision detection device 1 after the stationary die 70 and the second movable die 74 are removed. Referring to FIG. 11, the mold member 3 is molded in the c-shaped opening of the load transmission member 4, to be integral with the load transmission member 4. The optical fiber member 2 and the concave-convex member 5 are fixed in the mold member 3 which is transparent.

According to the manufacturing method, the collision detection device 1 is constructed of the load transmission member 4, the optical fiber member 2, the concave-convex member 5 and the mold member 3 which are integrated with each other by molding, without using an adhesive, a double-sided tape or the like for bonding. Because the mold member 3 is transparent, the arrangement positions of the concave-convex member 5 and the optical fiber member 2 can be verified by a visual identification from the outer side of the mold member 3, as shown in FIG. 11.

Next, it will be described the method of verifying the collision detection device 1 which is constructed based on the above-described manufacturing method. For example, the construction of the collision detection device 1 can be verified through a viewing of a lateral-direction sectional view of the collision detection device 1.

That is, when the load transmission member 4 and the mold member 3 shown in FIG. 11 are closely connected with each other, it can be determined that the collision detection device 1 has been appropriately constructed through the above-described manufacturing method. In this case, the double-side tape, the adhesive or the like does not exist between the load transmission member 4 and the transparent mold member 3.

Moreover, when the optical fiber member 2 and the mold member 3 shown in FIG. 11 are closely connected with each other, it can be determined that the collision detection device 1 has been appropriately constructed through the above-described constructing method. In this case, the double-side tape, the adhesive or the like does not exist between the optical fiber member 2 and the transparent mold member 3.

Moreover, when the concave-convex member 5 and the mold member 3 shown in FIG. 11 are closely connected with each other, it can be determined that the collision detection device 1 has been appropriately constructed through the above-described manufacturing method. In this case, the double-side tape, the adhesive or the like does not exist between the concave-convex member 5 and the transparent mold member 3.

Next, the effect of the collision detection device 1 will be described.

According to this embodiment, the collision detection device 1 is constructed of the load detection member 2 (e.g., optical fiber member), the concave-convex member 5, the load transmission member 4 (i.e., attachment member) and the mold member 3, which are integrated with each other by molding provided with two kinds of injection materials. That is, for example, the polybutylene terephthalate and the silicon rubber are respectively injected to construct the polybutylene terephthalate member 73 which forms the load transmission member 4 and the silicon rubber member 76 which forms the mold member 3. Moreover, because the concave-convex member 5 has the substantial tape shape, the molding can be simplified.

Therefore, the manufacture of the collision detection device 1 is simplified, as compared with the case where these components are respectively manufactured and integrated with each other by bonding through the adhesive, the double-side tape or the like. Moreover, according to this embodiment, the collision detection device 1 is constructed of the optical fiber member 2, the concave-convex member 5, the load transmission member 4 and the mold member 3, which are closely connected with each other by molding provided with two kinds of injection materials. Therefore, the joining strength among the components is increased. Accordingly, detachment of the components from each other can be restricted, even when the impact due to the collision is relatively large.

Furthermore, the mold member 3 can be resiliently deformed to partially absorb the impact energy in the collision. Therefore, a fault of the optical fiber member 2 can be restricted even when the impact is relatively large. Thus, a repair cost of the collision detection device 1 (optical fiber member 2) after the collision can be reduced.

According to the first embodiment, as shown in FIG. 11, the mold member 3 is provided with such a transparency that the concave-convex member 5 and the optical fiber member 2 can be visually verified from the exterior. Thus, an abnormality (e.g., concave-convex member 5 and optical fiber member 2 do not coincide with each other in collision direction) of the concave-convex member 5 and the optical fiber member 2 can be readily detected. The collision direction corresponds to the vehicle front-rear direction, for example. The mold member 3 is made of the silicon rubber, thus being relatively simply formed and fixed to the outer side of the optical fiber member 2 through the molding provided with two kinds of injection materials.

The collision detection device 1 is provided with the concave-convex member 5, which partially contacts the rear surface of the optical fiber member 2 only at the protrusion portions 50, referring to FIG. 5. Therefore, the pressure which is applied at the optical fiber member 2 in the collision will be increased, so that the load-detecting sensitivity of the optical fiber member 2 can be improved.

The concave-convex member 5 is positioned between the optical fiber member 2 and the bumper reinforce member 93 disposed at the rear side of the optical fiber member 2. The stiffness of the bumper reinforce member 93 is higher than that of the load transmission member 4, so that the bumper reinforce member 93 is substantially resistant to a deformation in the collision. Because the concave-convex member 5 is supported (from rear side) by the bumper reinforce member 93 through the mold member 3, the concave-convex member 5 is also substantially resistant to a deformation (incline) in the collision. Accordingly, a press of the optical fiber member 2 by the protrusion portions 50 due to an incline (rightward or leftward) of the concave-convex member 5 in the collision can be restricted. Thus, the load-detecting sensitivity of the optical fiber member 2 can be further improved.

Moreover, according to this embodiment, the optical fiber member 2 is used as the load detection member. Because the optical fiber member 2 does not transmit electromagnetic wave, it is unnecessary to provide an electromagnetic wave shield. Accordingly, the manufacture cost can be reduced. Furthermore, in this case, other electric apparatuses (e.g., detection circuit 80 shown in FIG. 2) adjacent to the optical fiber member 2 will not be affected by the electromagnetic wave.

Because the optical fiber member 2 is used as the load detection member for the collision detection device 1, the collision load can be detected with respect to inline or in-surface positions, without being detected point-by-point. That is, the collision load can be detected in a relatively extensive range by adjusting the arrangement path of the optical fiber member 2.

Second Embodiment

A second embodiment of the present invention will be described according to FIGS. 12-14. According to the second embodiment, an up-down direction width of a center portion (of the vehicle width direction) of the mold member 3 is set larger than those of two end portions (of the vehicle width direction) of the mold member 3. Moreover, the opening of the load transmission member 4 is provided with the optical fiber member 2 therein going-returning once in the vehicle width direction. Those are different from the above-described first embodiment.

Figure 12A:
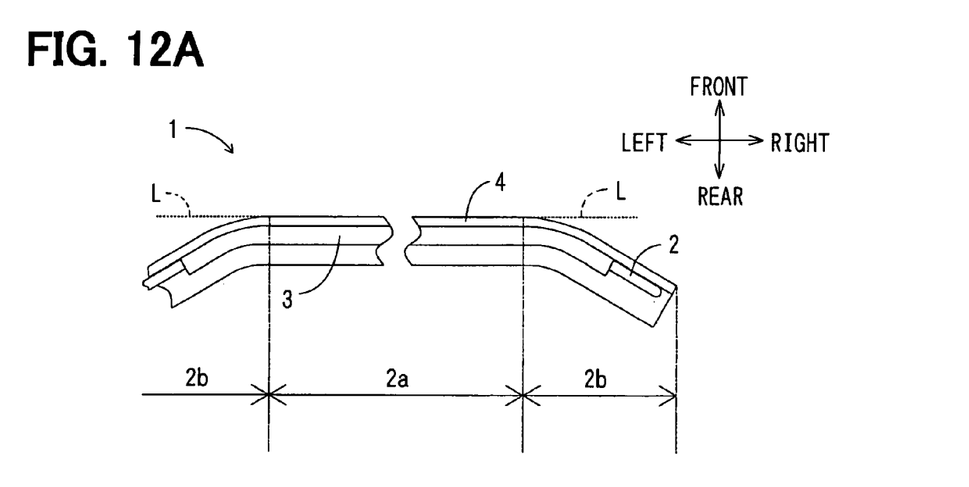
FIG. 12A is a transparent schematic view showing a collision detection device when being viewed from an upper side thereof according to a second embodiment of the present invention.
Figure 12B:
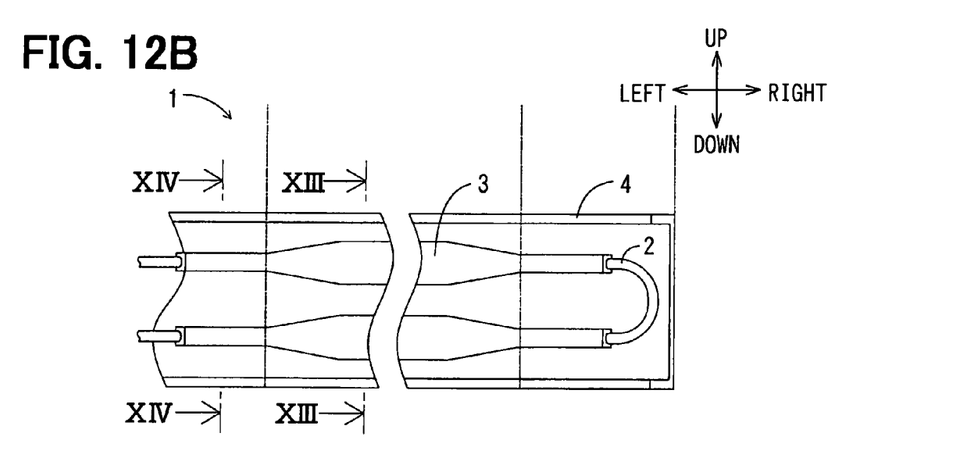
FIG. 12B is a transparent schematic view showing the collision detection device when being viewed from a rear side thereof.

As shown in FIG. 12, the optical fiber member 2 (being bend-typed load detection member) includes a frontal portion 2a and two incline portions 2b arranged respectively at the right side and the left side of the frontal portion 2a. The frontal portion 2a extends in the vehicle width direction to be perpendicular to the collision direction (e.g., vehicle front-rear direction). In this case, the frontal portion 2a faces the vehicle front side. The incline portion 2b is bent to the vehicle rear side with respect to the frontal portion 2a, so that the surface of the incline portion 2b extends in a direction which intersects the extending direction (indicated by the point-line L in FIG. 12) of the surface of the frontal portion 2a.

In this case, as shown in FIG. 12B, the optical fiber member 2 having the substantial cord shape twice traverses the load transmission member 4 in the vehicle width direction. That is, the opening of the load transmission member 4 is provided with the optical fiber member 2 therein going-returning once in the vehicle width direction. The mold member 3 includes an upper portion surrounding the optical fiber member 2 of the upper side and a lower portion surrounding the optical fiber member 2 of the lower side.

Figure 13:
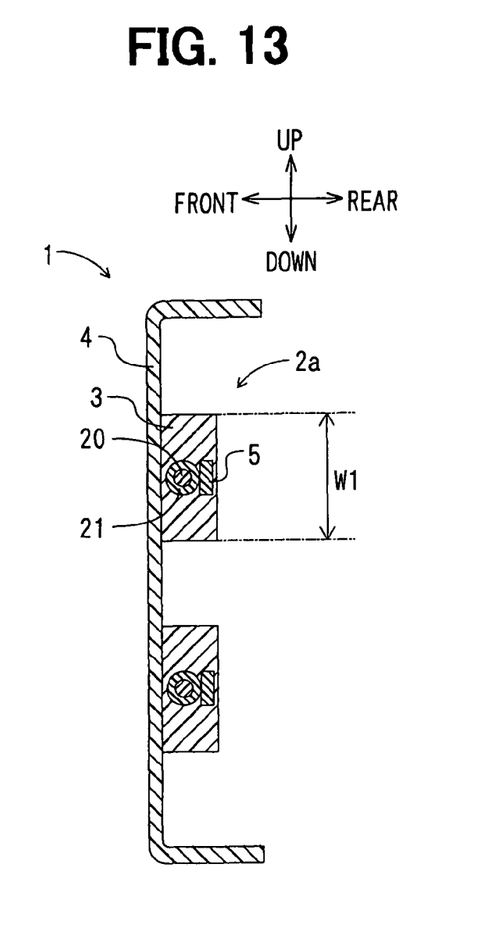
FIG. 13 is a vertical sectional view taken along a line XIII-XIII in FIG. 12B.
Figure 14:
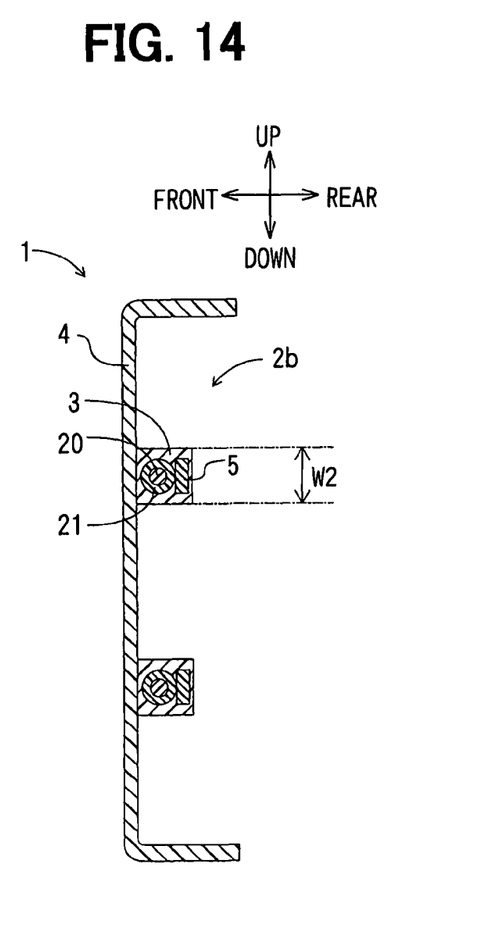
FIG. 14 is a vertical sectional view taken along a line XIV-XIV in FIG. 12B.

As shown in FIGS. 13 and 14, a maximum width W2 (dimension of vehicle up-down direction) of the mold member 3 which surrounds the incline portion 2b of the optical fiber member 2 is set smaller than a maximum width W1 (dimension of vehicle up-down direction) of the mold member 3 which covers the frontal portion 2a. Moreover, a width (dimension of vehicle up-down direction) of the mold member 3 which covers the frontal portion 2a is even (equal to W1) except for the right and left ends thereof. On the other hand, a width (dimension of vehicle up-down direction) of the mold member 3 which covers the incline portion 2b is even (equal to W2) at the whole range of the incline portion 2b. The average width of the vehicle up-down direction of the mold member 3 which covers the incline portion 2b is smaller than that of the mold member 3 which covers the frontal portion 2a.

That is, the up-down direction width of the center portion of the mold member 3 is larger than those of the two end portions of the mold member 3.

The collision detection device 1 according to the second embodiment has the same effects with those described in the first embodiment.

As described above, the load-detecting sensitivity of the incline portion 2b of the optical fiber member 2 (bend-typed load detection member) is smaller than that of the frontal portion 2a, so that the output of the incline portion 2b is smaller than that of the frontal portion 2a even when the same load is exerted at the incline portion 2a and the frontal portion 2a. In this case, the spring constant of the mold member 3 covering the incline portion 2b can be set smaller than that covering the frontal portion 2a, so that the mold member 3 covering the incline portion 2b has a larger deformation than that covering the frontal portion 2a when the same load is exerted at the incline portion 2b and the frontal portion 2a. Thus, a disparity in the outputs of the incline portion 2b and the frontal portion 2a of the optical fiber member 2 can be reduced.

For example, as described above, the average width of the vehicle up-down direction of the mold member 3 which covers the incline portion 2b is set smaller than that of the mold member 3 which covers the frontal portion 2a. Therefore, the mold member 3 which covers the incline portion 2b will have a lager deformation than that covers the frontal portion 2a, in the case where the same collision load is exerted at the frontal portion 2a and the incline portion 2b. Thus, the disparity in the outputs of the incline portion 2b and the frontal portion 2a of the optical fiber member 2 can be reduced.

Third Embodiment

Figure 15:
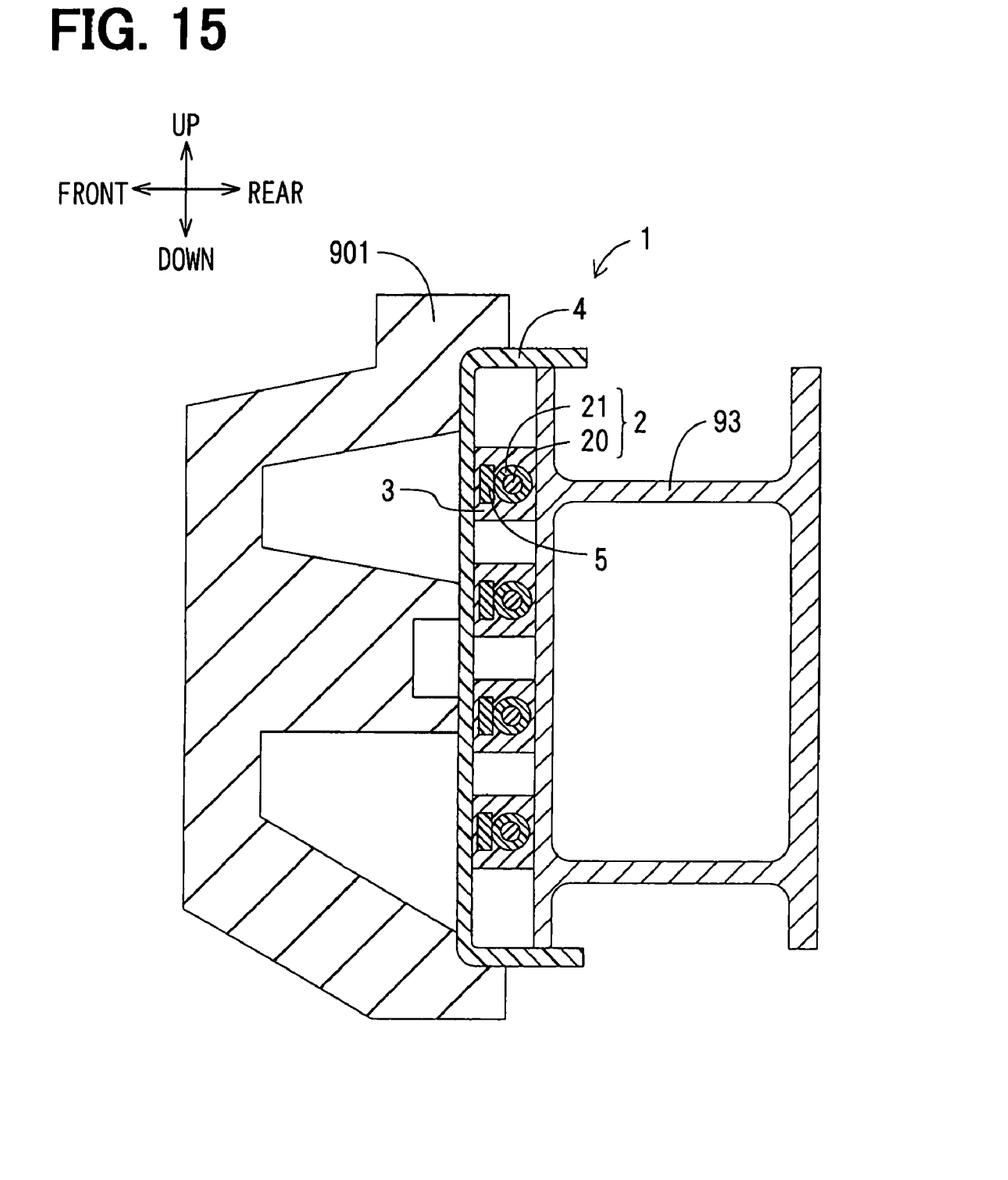
FIG. 15 is a lateral-direction sectional view showing a collision detection device according to a third embodiment of the present invention.

According to a third embodiment of the present invention, the concave-convex member 5 is arranged between the optical fiber member 2 and the load transmission member 4, which is different from the above-described first and second embodiments.

As shown in FIG. 15, the concave-convex member 5 is positioned between the rear surface of the load transmission member 4 and the front surface of the optical fiber member 2. The protrusion portions 50 (not shown in FIG. 15) of the concave-convex member 5 contact the clad portion 21 of the optical fiber member 2. The collision detection device 1 according to the second embodiment has the same effects with those described in the first embodiment.

Other Embodiments

Although the present invention has been fully described in connection with the preferred embodiments thereof with reference to the accompanying drawings, it is to be noted that various changes and modifications will become apparent to those skilled in the art.

In the above-described embodiments, the collision detection device 1 is constructed through the molding provided with two kinds of injection materials. However, the collision detection device 1 can be also manufactured in other method. For example, at first, the optical fiber member 2, the concave-convex member 5 and the mold member 3 are integrated with each other through an extrusion molding. Then, the extrusion-molding assembly of the optical fiber member 2, the concave-convex member 5 and the mold member 3 is joined to the load transmission member 4.

Moreover, in the above-described embodiments, the mold member 3 is transparent. However, the mold member 3 can be also opaque. The material of the mold member 3 is not limited in the present invention. The mold member 3 can contain at least one of a thermosetting resin and a thermoplastic resin. That is, the mold member 3 can be made of a single material or multiple materials including at least one of the thermosetting resin and the thermoplastic resin, so that the load detection member 2 can be relatively simply provided with the mold member 3 formed and fixed at least at the surface thereof of the side of the collision direction.

For example, the mold member 3 can be made of a thermoplastic elastomer. In this case, the hard portion (crystalline portion) can be polystyrene, and the soft portion can be polybutadiene or styrene thermoplastic elastomer (being polyisoprene). Alternatively, the hard portion can be polypropylene, and the soft portion can be olefin thermoplastic elastomer (being α-olefin copolymer). More alternatively, the hard portion can be polyester, and the soft portion can be polyether or polyester thermoplastic elastomer (being polymethylene). More alternatively, the hard portion can be polyamide, and the soft portion can be polyether or polyamide thermoplastic elastomer (being polymethylene).

The thermoplastic elastomer is solid at room temperature, and melted when being heated. Thus, the load detection member 2 (e.g., optical fiber member) can be relatively simply provided with the mold member 3 at least at the surface thereof of the side of the collision direction. Moreover, the mold member 3 which is made of the thermoplastic elastomer can have a rubber resilience without being vulcanized or provided with a vulcanization material. In this case, the rubber resilience of the mold member 3 is adjustable by changing the composition of the thermoplastic elastomer. Furthermore, the mold member 3 which is made of the thermoplastic elastomer has a satisfactory recycle performance.

Alternatively, the mold member 3 can be also made of a hot melt adhesive, which has a major composition of the thermoplastic resin and is semi-solid or solid in room temperature. The thermoplastic resin can be one of olefin resin, synthetic resin, ethylene vinyl acetate copolymer resin and the like. In this case, the hot melt adhesive which is melted is contacted with the surface of the load detection member 2 at least at the side of the collision direction. Thereafter, the hot melt adhesive will cool (e.g., naturally cool), to relatively simply form the mold member 3 which is fixed to the load detection member 2.

Moreover alternatively, the mold member 3 can be also made of a rubber. The rubber can be one of fluorosilicone rubber, ethylene propylene rubber, chloroprene rubber, acrylonitrile-butadiene rubber, butyl rubber, acrylic rubber, urethane rubber, fluorine-contained rubber and the like.

Moreover, in the above-described embodiments, the construction of the collision detection device 1 through the above-described manufacture method is visually verified by viewing the cross section thereof. However, the verification of the construction is not limited to the viewing of the cross section of the collision detection device 1.

Furthermore, in the second embodiment, the spring constant of the mold member 3 which covers the incline portion 2b is set smaller than that covers the frontal portion 2a. For this sake, the mold member 3 covering the incline portion 2b can be provided with an air cabin therein. Alternatively, the mold member 3 covering the incline portion 2b can be provided with a smaller thickness (dimension of vehicle front-rear direction) than that covering the frontal portion 2a. More alternatively, the mold member 3 coving the incline portion 2b can be made of a resin different from that covering the frontal portion 2a. Specifically, the mold member 3 covering the incline portion 2b is made of the resin having a lower hardness than that covering the frontal portion 2a.

Furthermore, in the above-described embodiments, the collision detection device 1 is mounted at the front bumper 90 of the vehicle 9. However, the collision detection device 1 can be also attached to any position of the periphery surface of the vehicle 9, for example, a rear bumper, a side moulding, a weather strip of a front door or a rear door, a side spoiler, a side sill or the like.

In the above-described embodiments, the optical fiber member 2 is used as the load detection member. However, a strain gauge, a pressure sensor or the like which is capable of detecting a load can be also used as the load detection member.

Such changes and modifications are to be understood as being in the scope of the present invention as defined by the appended claims.

The invention claimed is:
1. A collision detection device for a vehicle, comprising:
 a load transmission member that has an opening facing a rear side of the vehicle, the load transmission member having a substantially c-shaped cross section when viewed from a side surface of the vehicle;
 a load detection member for detecting a collision load in a collision, the load detection member being disposed in the opening of the load transmission member;
 a mold member which is molded to be integral with the load detection member and covers at least a surface of a collision side of the load detection member, the mold member absorbing at least a part of impact energy in the collision through a resilient deformation; and a concave-convex member which has a substantial tape shape and is integrally molded with the load detection member, wherein the load detection member is an optical fiber member.

2. The collision detection device according to claim 1, wherein
the mold member is transparent so that the load detection member can be visually verified through the mold member from an exterior.

3. The collision detection device according to claim 1, wherein:
the load detection member is a bend-typed load detection member which includes a frontal portion and two incline portions, the frontal portion having a surface perpendicular to a collision direction, the incline portion having a surface which extends in an extension direction intersecting that of the frontal portion; and
the mold member which covers the incline portion has a smaller spring constant than that covers the frontal portion.

4. The collision detection device according to claim 1, wherein:
the load detection member is a bend-typed load detection member which includes a frontal portion and two incline portions, the frontal portion having a surface perpendicular to a collision direction, the incline portion having a surface which extends in an extension direction intersecting that of the frontal portion; and
an average width of the mold member covering the incline portion is smaller than that of the mold member covering the frontal portion, the average width being a dimension perpendicular to a longitudinal direction of the mold member.

5. The collision detection device according to claim 1, wherein the mold member contains at least one of a thermosetting resin and a thermoplastic resin.

6. The collision detection device according to claim 5, wherein the mold member is made of a hot melt adhesive.

7. The collision detection device according to claim 5, wherein the mold member is made of a thermoplastic elastomer.

8. The collision detection device according to claim 1, further comprising
an attachment member for an attachment of the load detection member, wherein
the mold member is molded to be integral with the attachment member.

9. The collision detection device according to claim 1, further comprising
a low-stiffness member which has a lower stiffness than a high-stiffness member, the load detection member being arranged between the high-stiffness member and the low-stiffness member, wherein
the concave-convex member is arranged at least at a position between the load detection member and the high-stiffness member and a position between the load detection member and the low-stiffness member the mold member being molded to be integral with the concave-convex member.

10. The collision detection device according to claim 9, wherein
the high-stiffness member is a bumper reinforce member of the vehicle, and the low-stiffness member is an attachment member which is integrated with the mold member.

11. The collision detection device according to claim 10, wherein:
the attachment member is disposed at a rear side of an absorber of a front bumper of the vehicle, and provided with an opening facing a vehicle rear side; and
the load detection member is the optical fiber member which is disposed in the opening of the attachment member and traverse the attachment member in the vehicle width direction.

12. The collision detection device according to claim 11, wherein:
the concave-convex member is disposed along an arrangement path of the load detection member; and
the concave-convex member is provided with a plurality of protrusion portions, which are spaced from each other at a predetermined distance and contact a surface of the load detection member.

13. The collision detection device according to claim 12, wherein the concave-convex member is made of a polybutylene terephthalate.

14. The collision detection device according to claim 1, wherein the load detection member is mounted at a front bumper of the vehicle.

15. The collision detection device according to claim 1, wherein:
the opening of the load transmission member is located at a front end portion of a bumper reinforce member of the vehicle such that the opening of the load transmission member surrounds the front end portion of the bumper reinforce member.

16. A method of manufacturing a collision detection device for a vehicle, including an attachment member, a load transmission member, a load detection member, a concave-convex member and a mold member, the method comprising:
swaging a stationary die and a first movable die, which are spaced from each other by a cavity having a c-shaped cross section;
injecting a melted first material into the cavity to form the attachment member having an opening;
replacing the first movable die by a second movable die,
the load transmission member, the load detection member and the concave-convex member which are beforehand prepared being disposed in the opening of the attachment member such that the load transmission member has an opening facing a rear side of the vehicle and has a substantially c-shaped cross section when viewed from a side surface of the vehicle, the load detection member is disposed in the opening of the load transmission member, a cavity in which the load detection member and the concave-convex member are accommodated being formed between the second movable die and the attachment member after the second movable die is arranged;
injecting a melted second material into the cavity to form the mold member; and
removing the stationary die and the second movable die.

17. The method of manufacturing the collision detection device according to claim 16, wherein
the concave-convex member is arranged at least at a position between the load detection member and a bumper reinforce member of the vehicle and a position between the load detection member and the attachment member.

18. The method of manufacturing the collision detection device according to claim 16, wherein the load detection member is an optical fiber member.

19. The method of manufacturing the collision detection device according to claim 16, wherein the first material which is injected is polybutylene terephthalate.

20. The method of manufacturing the collision detection device according to claim 16, wherein the second material which is injected contains at least one of a thermosetting resin and a thermoplastic resin.

21. The method of manufacturing the collision detection device according to claim 16, wherein:
the opening of the load transmission member is located at a front end portion of a bumper reinforce member of the vehicle such that the opening of the load transmission member surrounds the front end portion of the bumper reinforce member.

22. A collision detection device for a vehicle, comprising:
a load transmission member that has an opening facing a rear side of the vehicle, the load transmission member having a substantially c-shaped cross section when viewed from a side surface of the vehicle;
a load detection member for detecting a collision load in a collision, the load detection member being disposed in the opening of the load transmission member;
a mold member which is molded to be integral with the load detection member and covers at least a surface of a collision side of the load detection member, the mold member absorbing at least a part of impact energy in the collision through a resilient deformation; and
a concave-convex member which is integrally molded with the load detection member, wherein:
the load detection member is an optical fiber member; and
the concave-convex member is arranged only at one side of the load detection member.

23. The collision detection device according to claim 22, wherein
the load detection member is sandwiched between the load transmission member and the concave-convex member.

24. The collision detection device according to claim 23, wherein
the mold member is molded to be integral with the load transmission member.

25. The collision detection device according to claim 22, wherein:
the opening of the load transmission member is located at a front end portion of a bumper reinforce member of the vehicle such that the opening of the load transmission member surrounds the front end portion of the bumper reinforce member.

* * * * *